(12) United States Patent
Yae

(10) Patent No.: US 12,412,576 B2
(45) Date of Patent: Sep. 9, 2025

(54) VEHICLE AND CONTROL METHOD THEREOF

(71) Applicants: Hyundai Motor Company, Seoul (KR); Kia Corporation, Seoul (KR)

(72) Inventor: Seong Soo Yae, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 316 days.

(21) Appl. No.: 18/074,870

(22) Filed: Dec. 5, 2022

(65) Prior Publication Data

US 2023/0206917 A1  Jun. 29, 2023

(30) Foreign Application Priority Data

Dec. 24, 2021 (KR) .................. 10-2021-0187750

(51) Int. Cl.
| | | |
|---|---|---|
| *G10L 15/22* | (2006.01) | |
| *B60K 35/00* | (2024.01) | |
| *B60K 35/10* | (2024.01) | |
| *G10L 25/78* | (2013.01) | |

(52) U.S. Cl.
CPC .............. *G10L 15/22* (2013.01); *B60K 35/00* (2013.01); *G10L 25/78* (2013.01); *B60K 35/10* (2024.01); *B60K 2360/148* (2024.01); *G10L 2015/223* (2013.01)

(58) Field of Classification Search
CPC ... G10L 15/22; G10L 25/78; G10L 2015/223; G10L 15/30; B60K 35/00; B60K 35/10; B60K 2360/148; G06F 3/167; B60W 40/08; B60W 50/08; B60W 2040/089; B60W 2050/0005
USPC .............................................. 704/270
See application file for complete search history.

(56) References Cited

U.S. PATENT DOCUMENTS

| | | |
|---|---|---|
| 2007/0094033 A1 | 4/2007 | Nagashima et al. |
| 2011/0276329 A1 | 11/2011 | Ayabe et al. |
| 2018/0204570 A1* | 7/2018 | Puranik ............ H04N 21/41422 |
| 2019/0147862 A1 | 5/2019 | Lu et al. |

FOREIGN PATENT DOCUMENTS

| | | | | |
|---|---|---|---|---|
| JP | 2001296890 A | | 10/2001 | |
| JP | 2004258233 A | | 9/2004 | |
| JP | 2006197298 A | | 7/2006 | |
| JP | 201122748 A | | 2/2011 | |
| KR | 2004258233 A | * | 9/2004 | .............. G10L 15/28 |
| KR | 20180081933 | * | 7/2018 | .......... B60R 16/0373 |

* cited by examiner

*Primary Examiner* — Davetta W Goins
*Assistant Examiner* — Fouzia Hye Solaiman
(74) *Attorney, Agent, or Firm* — Fox Rothschild LLP

(57) ABSTRACT

A voice recognition apparatus for use in a vehicle may include: a user interface configured to receive a command from a user; a memory configured to store data about a voice recognition usage history of the user; and a processor configured to change a voice recognition guide mode to one of a plurality of modes divided according to a degree of detail of a voice recognition guide based on the voice recognition usage history. Corresponding methods for controlling a voice recognition apparatus for use in a vehicle are disclosed.

15 Claims, 12 Drawing Sheets

FIG. 5

| DOMAIN X / COMMAND Y | CALL1 | | | | CALL2 | | | | CP SERVICE3 | | | | VEHICLE SETTING | | | | SP | | |
|---|---|---|---|---|---|---|---|---|---|---|---|---|---|---|---|---|---|---|---|
| | | PCc | Vp | Vpc | | PCc | Vp | Vpc | | PCc | Vp | Vpc | | PCc | Vp | Vpc | PCc | Vp | Vpc |
| COMMAND 1 | CALL | 1 | 2 | 0 | DESTINATION SETTING | 0 | 3 | 0 | WEATHER | 0 | 3 | 1 | LIGHTING | 1 | 1 | 0 | | | |
| COMMAND 2 | CALL BY NAME | 0 | 3 | 1 | STOPOVER POINT SETTING | 1 | 2 | 0 | FORTUNE | 1 | 1 | 0 | AIR CONDITIONING | 1 | 1 | 0 | | | |
| COMMAND 3 | DEVICE CHANGE | 0 | 3 | 0 | ROUTE CANCELLATION | 2 | 1 | 0 | STOCK MARKET | 2 | 1 | 0 | HOW TO USE | 0 | 3 | 1 | 0 | 3 | 0 |
| COMMAND 4 | .. | | | | .. | | | | NEWS | 1 | 2 | 0 | .. | | | | | | |
| .. | .. | | | | .. | | | | .. | | | | .. | | | | | | |

FIG. 6

| CALL CONNECTION | BEFORE APPLICATION | AFTER APPLICATION |
|---|---|---|
| STAGE 1 | VOICE RECOGNITION START SIGNAL(PTT) | VOICE RECOGNITION START SIGNAL(PTT) |
| STAGE 2 | "SAY COMMAND" | BEEP SOUND |
| STAGE 3 | BEEP SOUND | "CALL" |
| STAGE 4 | "CALL" | "CALL HONG GIL-DONG" |
| STAGE 5 | "SAY YOUR NAME" | BEEP SOUND |
| STAGE 6 | BEEP SOUND | "OFFICE" |
| STAGE 7 | "CALL HONG GIL-DONG" | COMPLETED |
| STAGE 8 | "WHICH NUMBER TO CALL?" | |
| STAGE 9 | BEEP SOUND | |
| STAGE 10 | "OFFICE" | |
| STAGE 11 | COMPLETED | |

VEHICLE AND CONTROL METHOD THEREOF

CROSS-REFERENCE TO RELATED APPLICATION

This application claims under 35 U.S.C. § 119 the benefit of Korean Patent Application No. 10-2021-0187750, filed on Dec. 24, 2021, in the Korean Intellectual Property Office, the entire contents of which are incorporated herein by reference.

BACKGROUND

1. Technical Field

The disclosure relates to a vehicle and a control method thereof that may automatically set a voice prompt provided for a voice recognition usage guide according to a user's proficiency level.

2. Background

A vehicle refers to a machine travelling on a road or rail to move to a destination. In general, a vehicle is capable of moving by rotation of one or more wheels mounted on a vehicle body. Such a vehicle may include a three-wheeled or four-wheeled automobile, a two-wheeled vehicle such as a motorcycle, heavy construction equipment, a bicycle, or a train running on a railway.

Recently, a vehicle is equipped with a variety of devices for user convenience or fun of driving. For example, a device capable of recognizing a user's voice and performing various operations such as making a call, searching for a destination, etc., in response to the recognized voice may be installed inside a vehicle.

Such devices may include a terminal device such as a smartphone, an instrument panel, a navigation device, a head unit, and the like.

SUMMARY

An aspect of the disclosure provides a vehicle and a control method thereof that may automatically set a voice recognition guide mode based on a user's voice recognition usage history.

Additional aspects of the disclosure will be set forth in part in the description which follows and, in part, will be obvious from the description, or may be learned by practice of the disclosure.

According to an embodiment of the disclosure, there is provided a voice recognition apparatus for use in a vehicle. The apparatus may include: a user interface configured to receive a command from a user; a memory storage configured to store data, the data comprising a voice recognition usage history of the user; and a processor configured to change a voice recognition guide mode, the voice recognition guide mode being chosen from a plurality of voice recognition guide modes according to a degree of detail of a voice recognition guide based on the voice recognition usage history.

The plurality of modes include a first mode and a second mode, and if the first mode is changed to the second mode, the degree of detail of the voice recognition guide is increased.

The processor is configured to change the voice recognition guide mode from the second mode to the first mode, if: a number of successful voice recognition commands of the user is accumulated more than a reference number of times for the same command.

The processor is configured to change the voice recognition guide mode to the second mode, if the voice recognition guide mode is in the first mode and a voice recognition fails.

The processor is configured to determine that the voice recognition fails, if the user does not utter a command for a period of time greater than a reference period of time or the user inputs a command of another domain.

The processor is configured to determine that the voice recognition fails, if the user utters a single sound, and thereafter the command is input after a reference period of time.

If the first mode is changed to the second mode due to a failure of a voice recognition, and thereafter the voice recognition is successful by the user inputting a same command before the voice recognition guide ends, the processor is further configured to change the voice recognition guide mode to the first mode.

The processor is further configured to change the voice recognition guide mode from the first mode to the second mode, if the user does not use the vehicle for a time period greater than a reference number of days.

If the voice recognition guide mode is changed from the first mode to the second mode, and then a voice recognition is successful by the user inputting a same command before the voice recognition guide ends, the processor is configured to change the voice recognition guide mode to the first mode.

According to an embodiment of the disclosure, there is provided a control method of a voice recognition apparatus for use in a vehicle, the control method including: receiving a command from a user; storing data about a voice recognition usage history of the user; and changing a voice recognition guide mode chosen from a plurality of voice recognition guide modes according to a degree of detail of a voice recognition guide based on the voice recognition usage history.

The plurality of modes include a first mode and a second mode, and if the first mode is changed to the second mode, the degree of detail of the voice recognition guide is increased.

The changing of the voice recognition guide mode step changes the voice recognition guide mode from the second mode to the first mode, if: a number of successful voice recognition commands of the user is accumulated more than a reference number of times for the same command.

The changing of the voice recognition guide mode step changes the voice recognition guide mode to the second mode, if the voice recognition guide mode is the first mode and a voice recognition fails.

The changing of the voice recognition guide mode step determines that the voice recognition fails, if the user does not utter a command for a period of time greater than a reference period of time or the user inputs a command of another domain.

The changing of the voice recognition guide mode determines that the voice recognition fails, if the user utters a single sound, and thereafter the command is input after a reference period of time.

If the first mode is changed to the second mode due to a failure of a voice recognition, and thereafter the voice recognition is successful by the user inputting a same command before the voice recognition guide ends, the changing of the voice recognition guide mode changes the voice recognition guide mode to the first mode.

The changing of the voice recognition guide mode step changes the voice recognition guide mode from the first mode to the second mode, if the user does not use the vehicle for a time period greater than a reference number of days.

If the voice recognition guide mode is changed from the first mode to the second mode, and then a voice recognition is successful by the user inputting a same command before the voice recognition guide ends, the changing of the voice recognition guide mode changes the voice recognition guide mode to the first mode.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 illustrates examples of each variable in a vehicle according to an embodiment;

FIG. 6 is a diagram illustrating a difference between when the disclosure is applied to a vehicle according to an embodiment and when the disclosure is not applied to a vehicle according to an embodiment;

DETAILED DESCRIPTION

Figure 1:
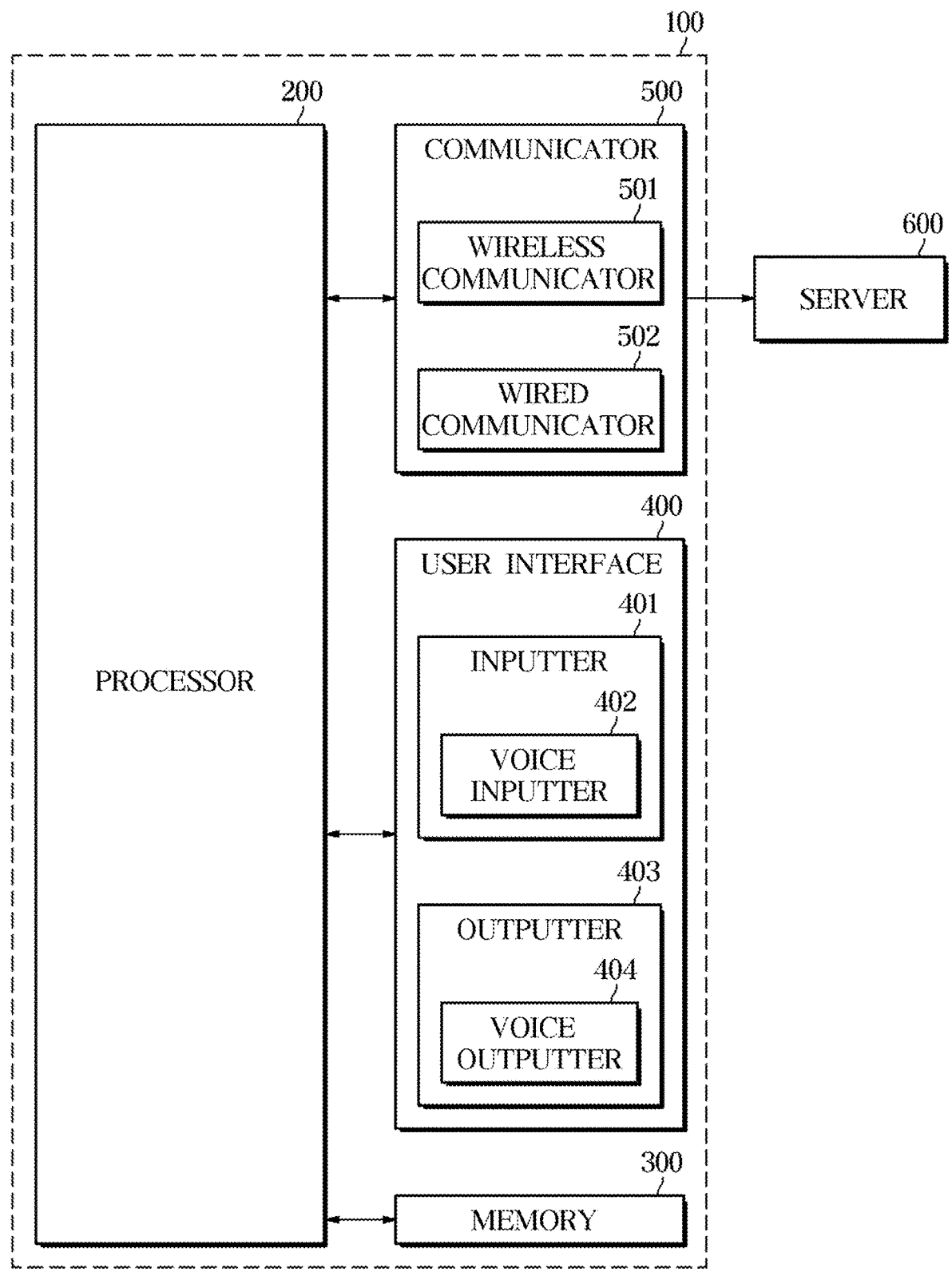
FIG. 1 is a control block diagram illustrating a vehicle according to an embodiment.

The embodiments set forth herein and illustrated in the configuration of the disclosure are only preferred embodiments, so it should be understood that they may be replaced with various equivalents and modifications at the time of the disclosure.

Like reference numerals throughout the specification denote like elements. Also, this specification does not describe all the elements according to embodiments of the disclosure.

It is to be understood that the singular forms are intended to include the plural forms as well, unless the context clearly dictates otherwise. It will be further understood that the terms "include", "comprise" and/or "have" when used in this specification, specify the presence of stated features, integers, stages, operations, elements, and/or components, but do not preclude the presence or addition of one or more other features, integers, stages, operations, elements, components, and/or groups thereof.

Also, the terms including ordinal numbers like "first" and "second" may be used to explain various components, but the components are not limited by the terms and the terms are only for the purpose of distinguishing a component from another. For example, without departing from the technical spirit or essential features of the disclosure, a first element may be referred to as a second element, and also a second element may be referred to as a first element. Description shall be understood as to include any and all combinations of one or more of the associated items when the items are described by using the conjunctive term "~ and/or ~", or the like.

Also, the terms such as "part", "device", "block", "member", "module", and the like may refer to a unit for processing at least one function or act. For example, the terms may refer to at least process processed by at least one hardware, such as field-programmable gate array (FPGA)/application specific integrated circuit (ASIC), software stored in a memory 300 or a processor 200.

Reference numerals used for method stages are just used for convenience of explanation, but not to limit an order of the stages. Thus, unless the context clearly dictates otherwise, the written order may be practiced otherwise.

The disclosed embodiments may be embodied in the form of a recording medium storing instructions executable by a computer. The instructions may be stored in the form of program code and, when executed by the processor 200, may generate a program module to perform the operations of the disclosed embodiments. The recording medium may be embodied as a computer-readable recording medium.

The computer-readable recording medium includes all kinds of recording media in which instructions which may be decoded by a computer are stored, for example, in read only memory (ROM), random access memory (RAM), magnetic tapes, magnetic disks, flash memory 300, optical recording medium, and the like.

Hereinafter, embodiments of a vehicle 100 and a control method thereof according to an aspect of the disclosure will be described in detail with reference to the accompanying drawings.

FIG. 1 is a control block diagram illustrating the vehicle 100 according to an embodiment.

Referring to FIG. 1, the vehicle 100 includes a memory 300 that transitory or non-transitory stores usage history information required for voice recognition, a user interface 400 including an inputter 401 and an outputter 403, a communicator 500 that performs wired/wireless communication with internal and external devices, and a processor 200 that controls the above-described constituent components.

Also, the vehicle 100 may wirelessly communicate with an external server 600 by controlling the communicator 500 by the processor 200.

The memory 300 may be used to store an image around the vehicle 100 photographed by a camera provided in the vehicle 100 in units of frames. Also, the memory 300 may be used to store wireless charger information received through the communicator 500 from an external terminal.

The memory 300 may include a volatile memory 300 such as a static random access memory (S-RAM) and dynamic random access memory (D-RAM), and a non-volatile memory 300 such as a read only memory (ROM), an erasable programmable read only memory (EPROM), and the like. The memory 300 may include one memory element or a plurality of memory elements.

As described with reference to FIG. 3 below, the memory 300 may include a guide prompt database (DB) 301 and a domain/command DB 302.

The user interface 400 may include the inputter 401 and the outputter 403. The inputter 401 may receive a command related to a control of the vehicle 100 from a user and transmit the command to the processor 200. The outputter 403 may display a voice recognition guide.

The user interface 400 may include an audio video navigation (AVN) display. According to the embodiment, however, the inputter 401 receiving the command from the user and the outputter 403 displaying the voice recognition guide are not limited to the AVN display.

Although the user interface 400 is not the AVN display, as long as the user may input a command through the inputter 401 and check the voice recognition guide through the outputter 403, types of the inputter 401 and the outputter 403 are not limited.

For example, the inputter 401 may be an automotive voice recognition system by including a voice inputter 402, and the outputter 403 may be a speaker that outputs a sound inside the vehicle 100 by including a voice outputter 404.

When the user utters a command, the automotive voice recognition system may analyze the input command, determine a domain corresponding to the command, and perform an operation.

Accordingly, when the inputter 401 is the automotive voice recognition system, the user may control the vehicle 100 by voice.

Specifically, the voice inputter 402 may be used for an electronic system for controlling the vehicle 100, controlling an air conditioning system of the vehicle 100 or inputting a destination in a navigation device through voice recognition.

Also, the voice outputter 404 may display information indicating a state of the vehicle 100, information for guiding a setting of the vehicle 100, a navigation screen, multimedia content, or information related to driving.

The communicator 500 may communicate with another vehicle or the external server 600 through a wireless communication base station, and include a wireless communicator 501 and a wired communicator 502.

For example, the communicator 500 may use communication methods of the second generation (2G) such as time division multiple access (TDMA), code division multiple access (CDMA), etc., communication methods of the third generation (3G) such as a wide code division multiple access (WCDMA), code division multiple access 2000 (CDMA 2000), wireless broadband (Wibro), world interoperability for microwave access (WiMAX), etc., and communication methods of the fourth generation (4G) such as long-term evolution (LTE), Wibro evolution, etc. The communicator 500 may also use the fifth generation (5G) communication method.

The communicator 500 may include at least one constituent component enabling communication with an external device, for example, at least one of a short-range communication module 108, the wired communicator 502 or the wireless communicator 501.

The short-range communication module 108 may include a variety of short-range communication modules that transmit and receive signals in a short distance using a wireless communication network, such as a Bluetooth module, infrared communication module, radio frequency identification (RFID) communication module, wireless local access network (WLAN) communication module, near-field communication (NFC) communication module, Zigbee communication module, and the like.

The wired communicator 502 may include various wired communicators such as a controller area network (CAN) communication module, local area network (LAN) module, wide area network (WAN) module, value added network (VAN) module, or the like, and also include various cable communication modules such as a universal serial bus (USB), high definition multimedia interface (HDMI), digital visual interface (DVI), recommended standard 232 (RS-232), power line communication, plain old telephone service (POTS), or the like.

The wireless communicator 501 may include wireless communicators that support a variety of communication methods such as a radio data system-traffic message channel (RDS-TMC), digital multimedia broadcasting (DMB), Wifi module, Wibro module, as well as global system for mobile communication (GSM), CDMA, WCDMA, universal mobile telecommunications system (UMTS), TDMA, LTE, and the like.

The wireless communicator 501 may include a wireless communication interface including a receiver and an antenna for receiving user login information. Also, the wireless communicator 501 may further include a signal conversion module for demodulating an analog wireless signal, received through the wireless communication interface, into a digital control signal.

When the user login information is received from the server 600, the communicator 500 may transmit corresponding data to the processor 200. Also, the communicator 500 may receive a control signal that requests the user login information from the processor 200 and transmit the control signal to the server 600.

The processor 200 may receive a command from the user and automatically change a voice recognition guide mode based on a voice recognition usage history of the user by controlling the memory 300, the user interface 400 and the communicator 50.

Specifically, the processor 200 may control the communicator 500 to transmit the user login information to the external server 600 and receive voice recognition usage history information from the server 600. Accordingly, a voice recognition guide may be set and provided differently for each command.

The voice recognition usage history information received by the processor 200 from the server 600 may include domain information x, command information y, information about a start prompt (SP), information about a prompt cancel count (PCc), information about a voice prompt count (VPc) and information about a voice prompt (VP).

The processor 200 may determine how familiar the user is with each command by using variables such as the SP, the PCc, the VPc and the VP.

For instance, when the user stops a voice recognition guide and attempts a voice recognition while the voice recognition guide is being performed, the processor 200 may determine that the user is familiar with the voice recognition guide for a corresponding command.

When the voice recognition is successful after stopping the voice recognition guide and attempting the voice recognition and a prompt cancel count (PCc) reaches more than a reference value by increasing the PCc, the processor 200 may change the voice recognition guide mode from a 'detailed guide' to a 'simple guide' or a 'simple guide' to a 'no guide'.

As described above, the 'detailed guide' may correspond to a first mode, the 'simple guide' may correspond to a second mode and the 'no guide' may correspond to a third mode, respectively.

According to an embodiment, the vehicle 100 automatically changes the voice recognition guide mode by determining whether the user is familiar with a command, thereby may provide an optimal voice recognition guide by providing a minimized guide for a familiar command and providing a detailed guide for an unfamiliar command.

A method of determining whether the user is familiar with each command by the processor 200 is described in detail with reference to the accompanying drawings below.

Figure 2:
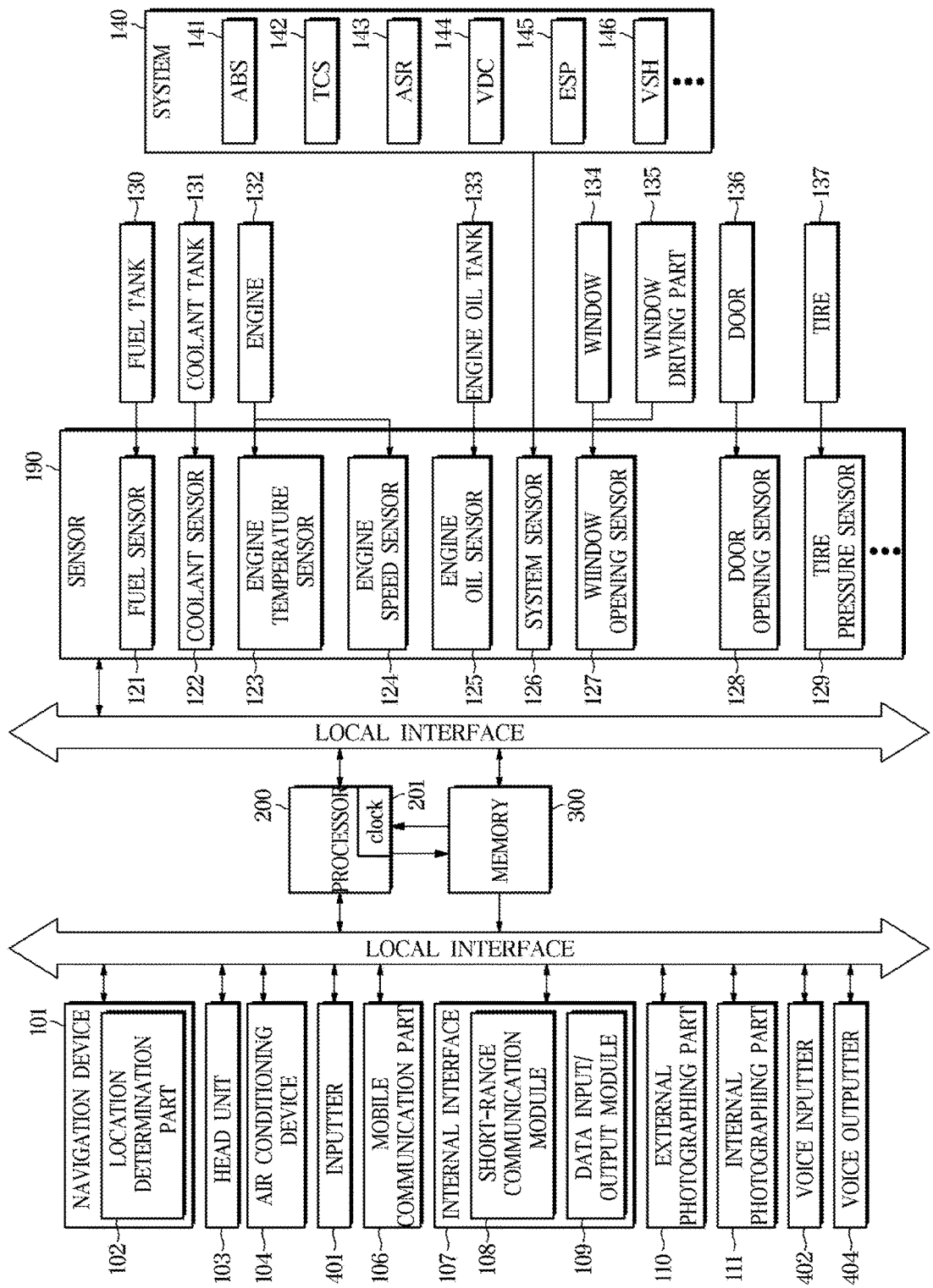
FIG. 2 is a detailed control block diagram illustrating constituent components controllable by voice recognition in a vehicle according to an embodiment.

FIG. 2 is a detailed control block diagram illustrating constituent components controllable by voice recognition in the vehicle 100 according to an embodiment.

The constituent components illustrated in FIG. 2 may be constituent components of the vehicle 100 that may be controlled by the processor 200 through voice recognition. The processor 200 may receive a command from a user through voice recognition and control the constituent components described below.

A navigation device 101 may include a location determination part 102 for determining a location of the vehicle 100. The location determination part 102 may measure the location of the vehicle 100. For example, the location determination part 102 may obtain location data using a global navigation satellite system (GNSS). Here, the GNSS includes a navigation system capable of calculating a location of a receiving terminal using a radio signal received from a satellite. For example, the GNSS may include navigation systems such as global positioning system (GPS), Galileo, global orbiting navigation satellite system (GLONASS), COMPASS, Indian regional navigational satellite system (IRNSS), Quasi-Zenith satellite system (QZSS), and the like. The processor 200 may control the navigation device 101 through voice recognition, and also input, change and cancel a destination.

A head unit 103 refers to a device capable of performing operations of radio reception, radio frequency setting, sound reproduction, and various control operations related thereto. For example, the head unit 103 or a radio receiving device may be installed on a center fascia provided in a center of a dashboard. The processor 200 may control the head unit 103 through voice recognition to control radio or sound reproduction.

A data input/output module 109 is provided to enable the vehicle 100 to perform wired communication with an external terminal such as a smartphone or a tablet computer. The vehicle 100 is communicatively connected with an external device through at least one cable connected to the data input/output module 109 and a connector of the data input/output module 109. For instance, the data input/output module 109 may include a USB connector, and also at least one of various interface connectors such as a HDMI connector or Thunderbolt connector. The data input/output module 109 may be installed in at least one of a center fascia, gear box or console box as per a designer's selection.

Also, at least one of an external photographing part 110 or an internal photographing part 111 may be further installed inside the vehicle 100. The external photographing part 110 photographs an image of an outside of the vehicle 100, for example, a front of the vehicle 100, and the internal photographing part 111 photographs an image of an inside of the vehicle 100. At least one of the external photographing part 110 or the internal photographing part 111 may be mounted on a dashboard or a lower side of an upper frame of vehicle body. In this case, at least one of the external photographing part 110 or the internal photographing part 111 may be mounted around a rear-view mirror of the vehicle 100.

At least one of the external photographing part 110 or the internal photographing part 111 may be implemented using a camera device including a charge coupled device (CCD), a complementary metal-oxide semiconductor (CMOS), or the like. The external photographing part 110 and the internal photographing part 111 may output an image signal corresponding to the photographed image.

The processor 200 may control the external photographing part 110 and the internal photographing part 111 to photograph an inside or outside of the vehicle 100 through voice recognition.

The voice outputter 404 for outputting a voice may be installed inside the vehicle 100. The voice outputter 404 may be implemented using a speaker device. For example, the speaker device may be mounted on various locations that may be considered by a designer such as a dashboard and/or rear shelf, etc. The voice outputter 404 may also include a speaker device provided in the navigation device 101.

In addition, the voice inputter 402 capable of receiving a voice uttered by at least one of the driver or a passenger may be mounted inside the vehicle 100. The voice inputter 402 may be implemented using a microphone. The voice inputter 402 may be mounted at a location where a voice of at least one of the driver or the passenger may be properly received, for example, a location such as at least one area under the upper frame of the vehicle body.

Also, an air conditioning device 104 that cools or heats air inside the vehicle 100 may be provided in an engine room or a space between the engine room and dashboard. A discharge port for discharging the air cooled or heated by the air conditioning device 104 may be provided inside the vehicle 100. The discharge port may be mounted on a dashboard, console box, and the like.

The processor 200 may control the air conditioning device 104 to adjust a temperature of the vehicle 100 through voice recognition.

In addition, a display for visually providing the driver or the passenger with various information may be mounted inside the vehicle 100. Here, the various information may include information related to the vehicle 100.

For example, the various information may include at least one of information about the vehicle 100 that a designer intends to provide, such as a speed of the vehicle 100, engine speed, engine temperature, the remaining amount of coolant, whether an engine oil is insufficient, and/or whether various systems installed in the vehicle 100 operate normally.

For example, the display may be implemented using a display mounted on the navigation device 101 or an instrument panel installed on a dashboard located in front of a steering wheel and providing various information about the vehicle 100, and the like.

The inputter 401 may receive a command from the driver or the passenger according to an operation of the driver or the passenger, and transmit a signal corresponding to the command to the processor 200. For example, the inputter 401 may be mounted on a center fascia, steering wheel, gear box, overhead console, trim of a door 136 and/or console box, etc. The inputter 401 may also be implemented using a touch screen of the navigation device 101.

In addition, various lighting devices may be further mounted inside the vehicle 100. The processor 200 may control a color or brightness of an internal lighting device through voice recognition.

As described with reference to FIG. 1, a module for performing wireless communication, e.g., at least one of a mobile communication module or the short-range communication module 108 may be further mounted on the vehicle 100 according to an embodiment. The processor 200 may transmit a command input by voice recognition to the server 600 through the communicator 500.

The mobile communication module is provided to transmit and receive data with another device located in a remote place, e.g., at least one of the server 600 or a terminal device. The vehicle 100 may access the World Wide Web (www) by using the mobile communication module, thereby may be provided with various external information such as news, information around the vehicle 100, weather information, and the like.

The mobile communication module may be implemented using a predetermined mobile communication technology. For example, the mobile communication module may be implemented using at least one communication technology that may be considered by a designer and based on a mobile communication standard such as the third generation partnership project (3GPP), 3GPP2, WiMAX, or the like.

For example, the mobile communication standard may include the GSM, enhanced data GSM environment (EDGE), WCDMA, CDMA, TDMA, and the like.

The short-range communication module 108 may be provided to wirelessly communicate with a device located in a short distance, e.g., a smartphone, tablet computer, laptop, and the like. The vehicle 100 may be paired with the device located in a short distance using the short-range communication module 108.

According to an embodiment, the short-range communication module 108 is communicatively provided using a predetermined short-range communication technology. For instance, the short-range communication module 108 may communicate with an external device using Bluetooth, Bluetooth low energy, CAN communication, Wi-Fi, Wi-Fi direct, WiMAX, ultra-wideband (UWB), Zigbee, infrared data association (IrDA), NFC, and the like.

For example, the mobile communication module and the short-range communication module 108 may be embedded in the navigation device 101 or the head unit 103, or installed on a board mounted in a space between an engine room and a dashboard. According to embodiments, at least one of the mobile communication module or the short-range communication module 108 may be manufactured as a separate device, and in this case, at least one of the mobile communication module or the short-range communication module 108 may be mounted on a terminal of the data input/output module 109 to perform communication between the vehicle 100 and an external device.

Referring to FIG. 2, the vehicle 100 may include at least one sensor 190, and the processor 200 may display a value output from the at least one sensor 190 based on user's voice recognition.

For example, the sensor 190 may include at least one of a fuel sensor 121, a coolant sensor 122, an engine temperature sensor 123, an engine speed sensor 124, an engine oil sensor 125, a system sensor 126, a window opening sensor 127, a door opening sensor 128, and a tire pressure sensor 129.

The fuel sensor 121 measures a remaining fuel amount in a fuel tank 130 and outputs information about the remaining fuel amount. The coolant sensor 122 measures a remaining coolant amount in a coolant tank 131 and outputs information about the remaining coolant amount. The engine temperature sensor 123 measures a temperature of an engine 132 and outputs information about the measured temperature and the engine speed sensor 124 measures a rotation number of the engine 132 and outputs corresponding information.

Also, the engine oil sensor 125 is provided to measure a remaining engine oil in an engine oil tank and output information about the remaining engine oil.

The system sensor 126 is provided to detect whether various systems 140 required for an operation of the vehicle 100 are normally operated. Here, for example, the system 140 may include at least one of an anti-lock brake system (ABS) 141 for adjusting a brake hydraulic pressure, a traction control system (TCS) 142, an anti-spin regular (ASR) 143, a vehicle dynamic control (VDC) 144, an electronic stability program (ESP) 145 and a vehicle stability management (VSM) 146. In addition to the above, the system sensor 126 may detect whether various systems for controlling an operation of each constituent component related to driving of the vehicle 100 are normally operated. The system sensor 126 may be provided separately for each of the above-described systems.

The window opening sensor 127 may detect whether a window 134 is open. For example, the window opening sensor 127 may be implemented using a window driving part 135 such as an encoder connected to a motor, and also implemented using various optical sensor 190 or a pressure sensor 190.

The door opening sensor 128 may detect whether the door 136 is open. The door opening sensor 128 may be implemented using the pressure sensor 190 or a switch element connected according to a closure of the door 136.

The tire pressure sensor 129 is provided to measure a pressure of a tire 137 surrounding a wheel, and for example, may be implemented using a piezoelectric sensor 190 or a capacitive sensor 190.

In addition to the above-described sensors, the vehicle 100 may further include a variety of sensors 190 for a corresponding purpose. For example, the vehicle 100 may further include a sensor 190 for measuring contamination or damage of a predetermined filter.

Information, output from the above-described navigation device 101, head unit 103, air-conditioning device 104, inputter 401, mobile communication part 106, internal interface 107 such as the short-range communication module 108 or the data input/output module 109, external photographing part 110, internal photographing part 111, at least one sensor 190, voice inputter 402, voice outputter 404 or an instrument panel, may be an object to be controlled by the processor 200.

The processor 200 and the memory 300 are electrically connected to each other to transmit and receive data. Also, at least one of the navigation device 101, head unit 103, air-conditioning device 104, inputter 401, mobile communication part 106, internal interface 107 such as the short-range communication module 108 or the data input/output module 109, external photographing part 110, internal photographing part 111, sensor 190, voice inputter 402, voice outputter 404 or instrument panel may be provided to transmit data to at least one of the processor 200 or the memory 300, and/or receive data or a control signal from at least one of the processor 200 or the memory 300 through a wire or cable in the vehicle 100, or through wireless communication network.

Figure 3:
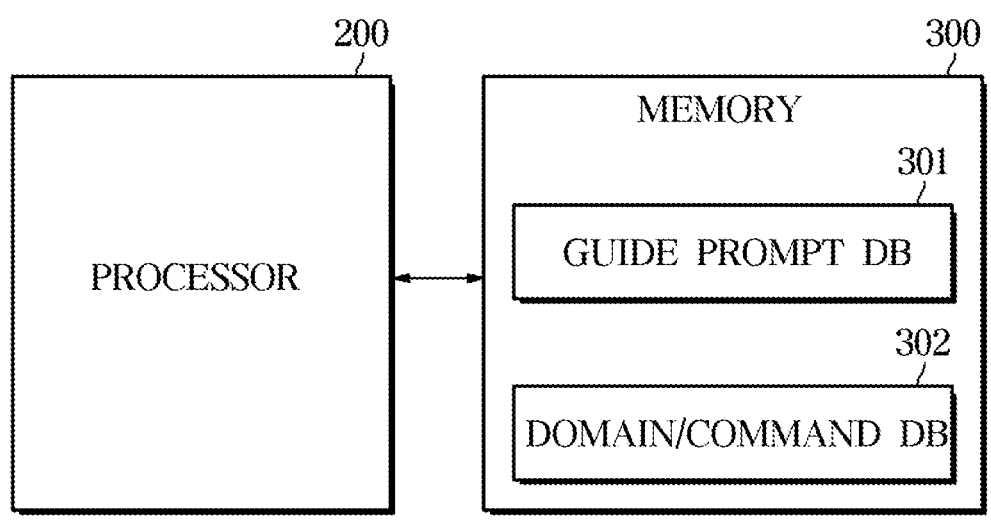
FIG. 3 is a detailed control block diagram illustrating a memory of a vehicle according to an embodiment.

FIG. 3 is a detailed control block diagram illustrating the memory 300 of the vehicle 100 according to an embodiment.

Referring to FIG. 3, the memory 300 may include the guide prompt DB 301 and the domain/command DB 302.

The DB may refer to a set of data stored under a predetermined standard, and data may be stored in each table in the DB.

The DB may store related information in a single table and maintain a plurality of tables, thereby may store data systematically. For example, a domain required for voice recognition as a single attribute and a command as another attribute may be stored in one table.

The guide prompt DB stores and databases guide prompt content for each voice recognition stage.

In the guide prompt DB, the content of the guidance prompt may be stored in the form of a wave, which is a waveform audio format, and the fixed word may be stored in the form of text.

Accordingly, the processor 200 may access the guide prompt DB and utilize the variable vocabulary and fixed vocabulary. Specifically, the processor 200 may include a text-to-voice (TTS).

The TTS may refer to a technology of converting written text into human voice. The TTS may segment and store a human voice recorded in advance into a predetermined phonetic unit, and when text is input, find and combine pieces of voice that match a sentence of the text in a database.

As such, the processor 200 may output the variable vocabulary and fixed vocabulary stored in the guide prompt DB as a voice using the TTS. Accordingly, the processor 200 may display a guide prompt to a user for each domain/command recognition stage.

The domain/command DB is a usage history database that stores how familiar the user is with each domain/command without recognition failure, as a variable.

The domain/command DB may include a command required for controlling the vehicle 100 and a domain corresponding to a control area of the command.

Also, the domain/command DB may store variables such as a start prompt (SP), a PCc, a VPc, and a VP.

In this instance, the SP refers to a guide when an initial voice recognition starts, the VP refers to a guide mode after the initial voice recognition, and the PCc refers to the number of times that the user stops a voice recognition guide and voice recognition is successful. Also, the VPc is a temporary variable displayed as 1 when a voice recognition fails in an expert mode among first modes.

The domain/command DB may provide the above variables to the processor 200 and the processor 200 may change a voice recognition guide mode depending on the variables, which is described in detail later.

Figure 4:
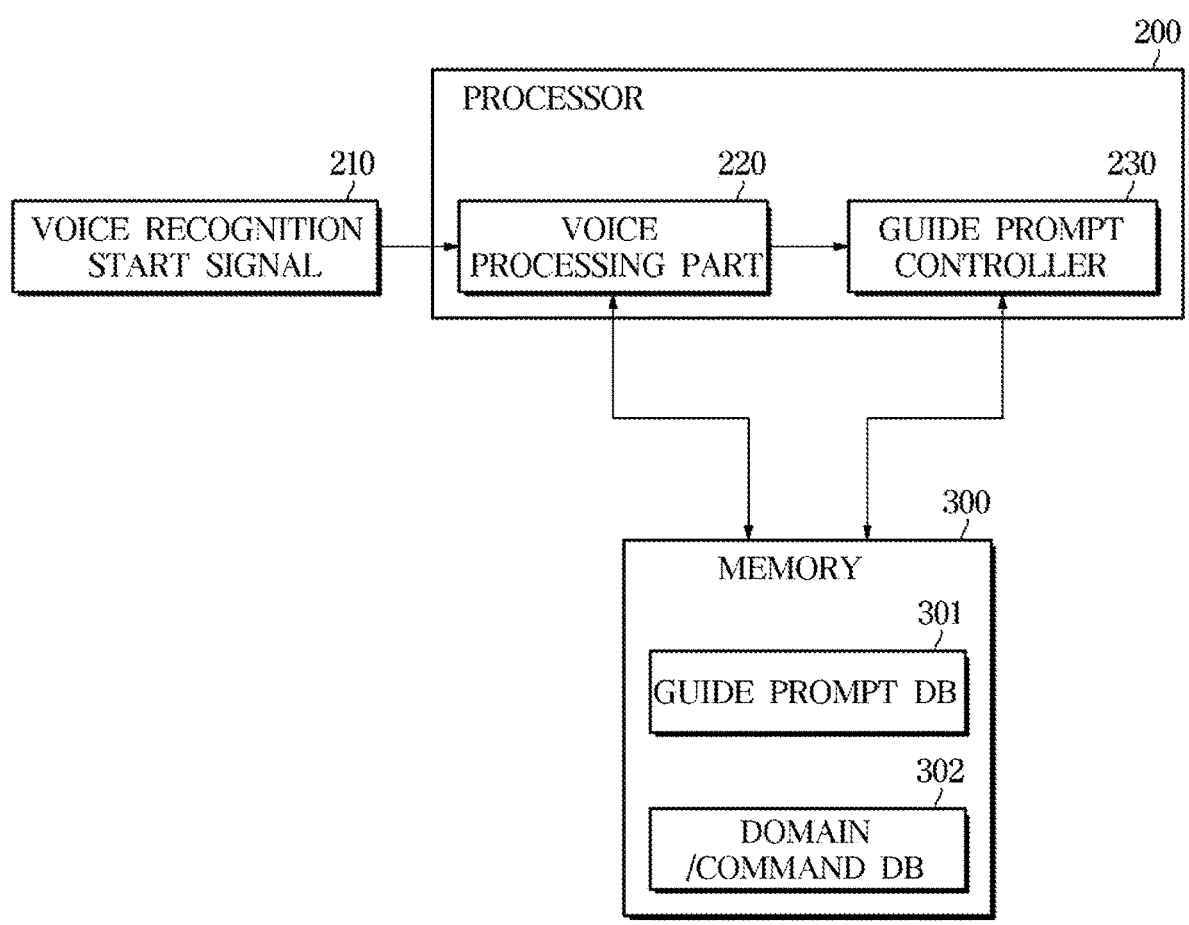
FIG. 4 is a detailed control block diagram illustrating a processor of a vehicle according to an embodiment.

FIG. 4 is a detailed control block diagram illustrating a processor of a vehicle according to an embodiment.

Referring to FIG. 4, the processor 200 may determine a wake-up through push-to-talk (PTT) as a voice recognition start signal 210.

When the voice recognition start signal 210 is received, the processor 200 may change a microphone of the inputter 401 to an input-enabled state. Afterwards, when a user inputs a command through the microphone of the inputter 401, the command may be analyzed through a voice processing part 220.

The voice processing part 220 may divide and extract the input command into a domain and a command.

Specifically, with respect to a method of analyzing a voice, when the user utters the user's voice, the uttered voice is input through the inputter 401. The inputter 401 may output an electrical signal corresponding to the uttered voice and the output electrical signal may be transmitted to the processor 200.

The voice processing part 220 of the processor 200 may perform voice recognition based on the received electrical signal. Specifically, the processor 200 may first detect a voice section from the received electrical signal. Here, the voice section refers to a section where a voice uttered by the user exists or is highly likely to exist.

When the voice section is detected, the processor 200 may remove and/or alleviate noise existing in the voice section. The processor 200 may use at least one filter for removing the noise in the voice section. A process for noise removal may be omitted depending on embodiments.

Afterwards, the processor 200 may extract a voice characteristic from the voice section. In this instance, the processor 200 may extract the voice characteristic from the voice section in a feature vector form, using at least one of a linear prediction coefficient (LPC), Cepstrum, Mel frequency cepstral coefficient (MFCC), or filter bank energy.

In response to the voice characteristic extraction, the processor 200 may determine a pattern corresponding to the extracted voice characteristic. For example, the processor 200 may determine the pattern for the voice characteristic using a predetermined acoustic model previously defined.

The acoustic model may be obtained by modeling a signal characteristic of voice. The processor 200 may determine the pattern for the voice characteristic by acquiring a frequency pattern having a similar or the same frequency pattern to that of human voice using the above-described acoustic model. Accordingly, a vocabulary such as a predetermined word, syllable, or short phrase may be recognized from the voice input through the inputter 401.

The processor 200 may recognize a sentence, or the like, by performing language processing by further using a predetermined language model, when required. The language model may be generated based on human languages, grammars, etc., in order to determine a linguistic order of recognized words, syllables, or phrases. Accordingly, the processor 200 may recognize the sentence corresponding to the voice.

The processor 200 may obtain a result of voice recognition through at least one of the pattern determination or language processing, and determine an operation requested or commanded by the user through user's voice according to the voice recognition result.

The voice processing part 220 of the processor 200 may determine whether the user is familiar with voice recognition for a specific command. Specifically, the voice processing part 220 may determine that the user is familiar with voice recognition for a specific command, when the user utters the command before a voice recognition guide ends and the voice recognition is successful.

That is, because the voice recognition is successfully performed without listening to the voice recognition guide to the end, it may be determined that the user is familiar with voice recognition for the corresponding command.

When the voice recognition is successful and it is determined that the user is familiar with voice recognition for the corresponding command, as described above, the processor 200 may increase a PCc by 1.

The processor 200 may not change a voice recognition guide mode until the PCc is increased to 3, which is a predetermined reference value, in order to secure a reliability of a familiarity level of the user for the command.

Afterwards, when the PCc becomes 3, the processor 200 may determine that the user is familiar with the corresponding command, and increase a VP value by 1.

The processor 200 may determine as a 'detailed guide' when a current VP value is 1, a 'simple guide' when the current VP value is 2, and a 'no guide' when the current VP value is 3, and proceed a guide prompt corresponding thereto.

That is, when it is determined that user is familiar with the corresponding command and the VP value is increased by 1, the processor 200 may guide by changing the 'detailed guide' to the 'simple guide' or the 'simple guide' to the 'no guide'.

In this instance, the processor 200 may divide the voice recognition guide mode into a first mode and a second mode according to a degree of detail of the voice recognition guide. The first and second modes may include the 'detailed guide', 'simple guide', and 'no guide'.

Also, in the degree of detail of the voice recognition guide, guiding all commands required for voice recognition to the user may be defined as being the most detailed, and displaying only a beep sound without guiding the command may be defined as being the least detailed.

Accordingly, for instance, in a domain of 'call', 'say your name' may be the 'detailed guide', 'name' may be the 'simple guide', and outputting only beep sound without any guide may correspond to 'no guide'.

In this instance, when the detailed guide is the second mode, the simple guide may be the first mode, and when the simple guide is the second mode, the 'no guide' may be the first mode, and also a degree of guide is not limited.

The processor 200 may determine that voice recognition fails when a command is not input for more than 4 seconds after the user starts using voice recognition for a specific command.

Also, when a command is not input for more than 2 seconds after the user utters a single sound following a start of voice recognition for a specific command, the processor 200 may determine that voice recognition fails, because the user hesitated due to unfamiliarity with the specific command.

When it is determined that the voice recognition fails as described above, the processor 200 may decrease the VP value of the corresponding command by 1.

That is, when it is determined that the voice recognition fails and the VP value is decreased by 1, the processor 200 may guide by changing the 'simple guide' to 'detailed guide' or the 'no guide' to the 'simple guide'.

As such, through the determination on the user's familiarity with the command, when it is determined that the user is familiar with the command, the processor 200 may minimize the guide, and when it is determined that the user is not familiar with the command, the processor 200 may provide detailed guide. Accordingly, a convenience of user who uses voice recognition may be improved.

A guide prompt controller 230 of the processor 200 may display a voice recognition guide mode changed according to the changed VP value.

For example, when the VP value is 1, that is, in the 'detailed guide', input methods of all commands required for voice recognition may be guided.

Specifically, in the domain of 'call', all of 'say a command', 'say your name' and 'which number to call' may be guided.

When the VP value is 2, i.e., in the 'simple guide', input methods of minimum commands required for voice recognition may be guided.

Specifically, in the domain of 'call', only 'command', 'name' and 'representative number' may be controlled to be simply guided.

When the VP value is 0, i.e., in the 'no guide', the guide as to the input methods required for voice recognition may be omitted.

Specifically, in the domain of 'call', the processor 200 may control so that only a beep sound is output without a guide and a call connection to a desired number is made.

The processor 200 does not physically include the voice processing part 220 and the guide prompt controller 230, and the voice processing part 220 and the guide prompt controller 230 may be the names given to functions of a controller for convenience of description.

FIG. 5 illustrates examples of each variable in a vehicle according to an embodiment.

Referring to FIG. 5, each command may have a PCc, a VP, and a VPc for each domain.

The VP corresponds to a guide mode. VP values (command 1:2, command 2:3, command 3:3) of frequently used and familiar call domain commands are mostly greater than VP values (command 1:1, command 2:1, command 3:3) of vehicle setting domain commands which are not used frequently and familiar.

Specifically, with respect to the call domain commands, because a command of "call" has a VP value of 2, 'simple guide' may be provided. For example, guidance may be made with a simple word of "command".

Also, because a command of "call by name" is an expert mode that a user is very familiar with, guidance may be omitted. That is, when voice recognition with "call" is successful according to the guide of "command", the user may input "call by name" immediately after a beep sound, without a guide of "what item to make a call?".

FIG. 6 is a diagram illustrating a difference between when the disclosure is applied to the vehicle 100 according to an embodiment and when the disclosure is not applied to the vehicle 100 according to an embodiment.

As described with reference to FIG. 5, the processor 200 may minimize a guide as to a command determined as being familiar to a user.

Accordingly, conventionally, guidance may be completed through the voice signal start signal 210 (stage 1), "say a command" (stage 2), a beep sound (stage 3), "call" (stage 4), "say a name" (stage 5), a beep sound (stage 6), "call Hong Gil-Dong" (stage 7), "which number to call?" (stage 8), a beep sound (stage 9), and "an office" (stage 10).

However, even when a user frequently uses a corresponding command and is familiar with the command, providing all the guides may increase a response time, causing inconvenience to the user, distracting while driving and causing an accident.

Therefore, according to an embodiment, when it is determined that all commands of call domain are familiar to the user, the vehicle 100 may complete the guide through the voice signal start signal (stage 1), a beep sound (stage 2), "call" (stage 3), a beep sound (stage 4), "call Hong Gil-Dong" (stage 5), a beep sound (stage 6) and "an office" (stage 7).

That is, unnecessary guide processes may be reduced based on a user's command usage history, thereby may shorten a response time and improve user's convenience.

Figure 7:
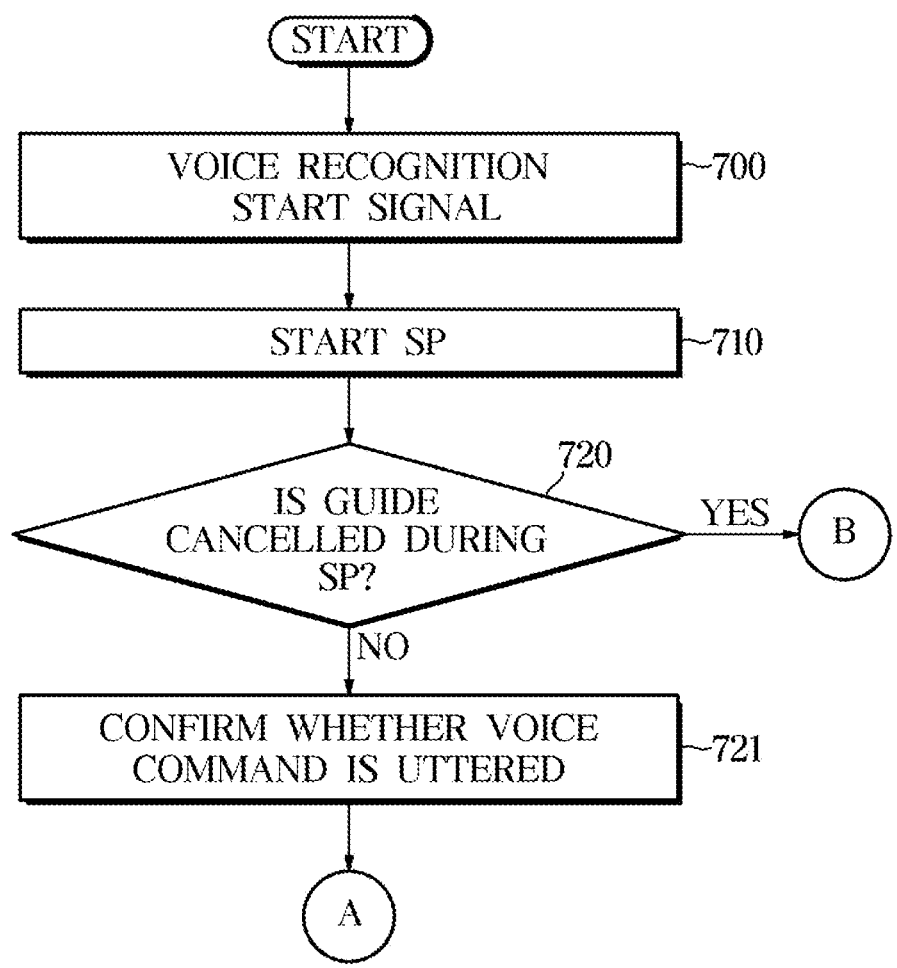
FIGS. 7 and 8 are flowcharts illustrating operations of updating a prompt cancel count (PCc) in a vehicle according to an embodiment.
Figure 8:
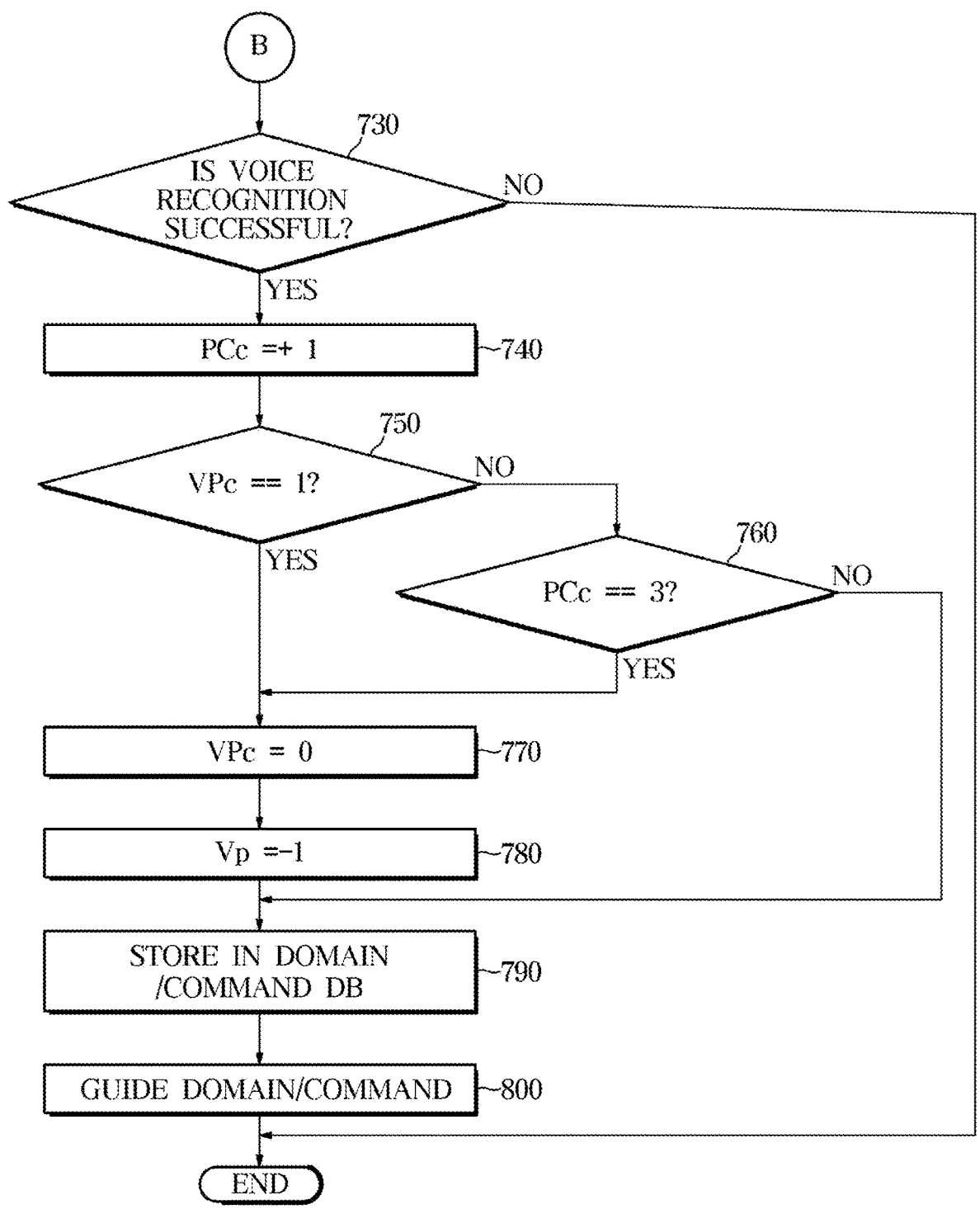

FIGS. 7 and 8 are flowcharts illustrating operations of updating a PCc in the vehicle 100 according to an embodiment.

Referring to FIGS. 7 and 8 together, the processor 200 may update a PCc in an initial state where a user starts using voice recognition.

When the voice recognition start signal 210 is received (700), the processor 200 may start a start prompt (SP) that provides a guide to receive a first command from the user (710). The SP is not limited, as long as it is a means to induce the user to input a command, such as "say a command".

The processor 200 may determine whether the user utters a command even though a voice recognition guide is not finished, i.e., when a guide is cancelled while providing the SP (720). Afterwards, the processor 200 may determine that the user is familiar with the corresponding command when voice recognition is successful (721).

That is, because the voice recognition is successful for the corresponding command without listening to the voice recognition guide for the command to the end, it may be determined that the user accurately recognizes a command to be required to be input and is familiar with the command.

When it is determined that the voice recognition is successful and the user is familiar with the command (Yes in operation 730), the processor 200 may increase the PCc by 1 (740).

Afterwards, the processor 200 may determine whether a VPc value is 1 (750).

The processor 200 may determine whether the PCc is 3 which is a predetermined reference value (760), in order to secure a reliability of a familiarity level of the user for the command. The processor 200 may not change a voice recognition guide mode until the PCc is increased to 3 (No in operation 760).

When the VPc value is 1 (Yes in operation 750), the processor 200 may determine that the recognition of the command fails in an expert mode where command usage is familiar for the user, set the VPc value as 0 (770), and change to a first mode by decreasing a VP value by 1 to reduce a degree of detail of guide (780).

That is, when the recognition of the command fails in the expert mode, which indicates that the user temporarily forgets the command despite the user's familiarity with the corresponding command, the processor 200 may change to the first mode by decreasing the VP value by 1 without accumulation of PCc, in order to reduce the degree of detail of guide.

Afterwards, the processor 200 may store the changed PCc in a domain/command DB (790), and when a same command is used later, may guide by reflecting a usage history.

The processor 200 may guide a domain/command in the changed voice recognition guide mode (800).

When the user listens to the voice recognition guide to the end, which indicates that the user is not familiar with the command, the processor 200 may confirm whether the user utters a voice command without changing the PCc (810).

Figure 9:
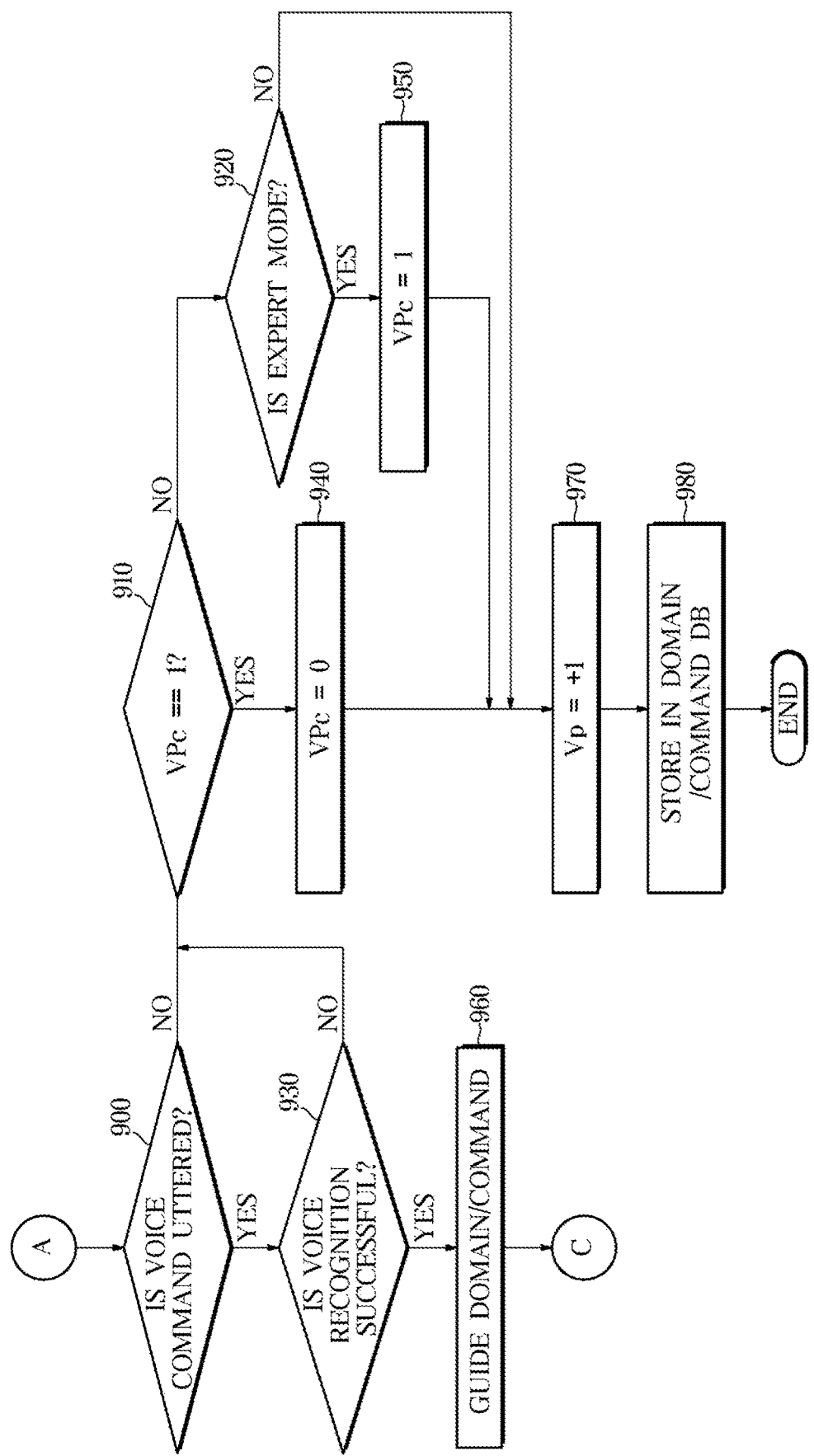
FIG. 9 is a flowchart illustrating operations of updating a voice prompt count (VPc) and a voice prompt (VP) in a vehicle according to an embodiment.

FIG. 9 is a flowchart illustrating operations of updating a VPc and a VP in the vehicle 100 according to an embodiment.

Referring to FIG. 9, the processor 200 may confirm whether a voice command is uttered (900). When the voice command is uttered (Yes in operation 900), the processor 200 may determine whether voice recognition is successful (930). When it is determined that the voice recognition is successful (Yes in operation 930), the processor 200 may display a guide corresponding to a domain and command (960).

When a user has not uttered the voice command (No in operation 900) or it is determined that the voice recognition fails due to utterance of another command (No in operation 930), the processor 200 may determine whether a VPc value is 1 (910).

When the VPc value is 1 (Yes in operation 910), the processor 200 may determine that the voice recognition fails in an expert mode where the user is very familiar with a command.

That is, when the VPc value is 1, which indicates that the voice recognition fails in the expert mode, the processor 200 may change the VPc value to 0 (940).

When the VPc value is not 1 (No in operation 910), the processor 200 may confirm whether a current guide mode is the expert mode (920), and when the current guide mode is the expert mode (Yes in operation 920), the processor 200 may change the VPc value to 1 and determine that the user temporarily forgets the command in the expert mode (950).

Afterwards, because the voice recognition fails, the processor 200 may decrease a VP value by 1 to increase a degree of detail of voice recognition guide (970).

Next, the processor 200 may store the changed PCc in a domain/command DB (980).

Figure 10:
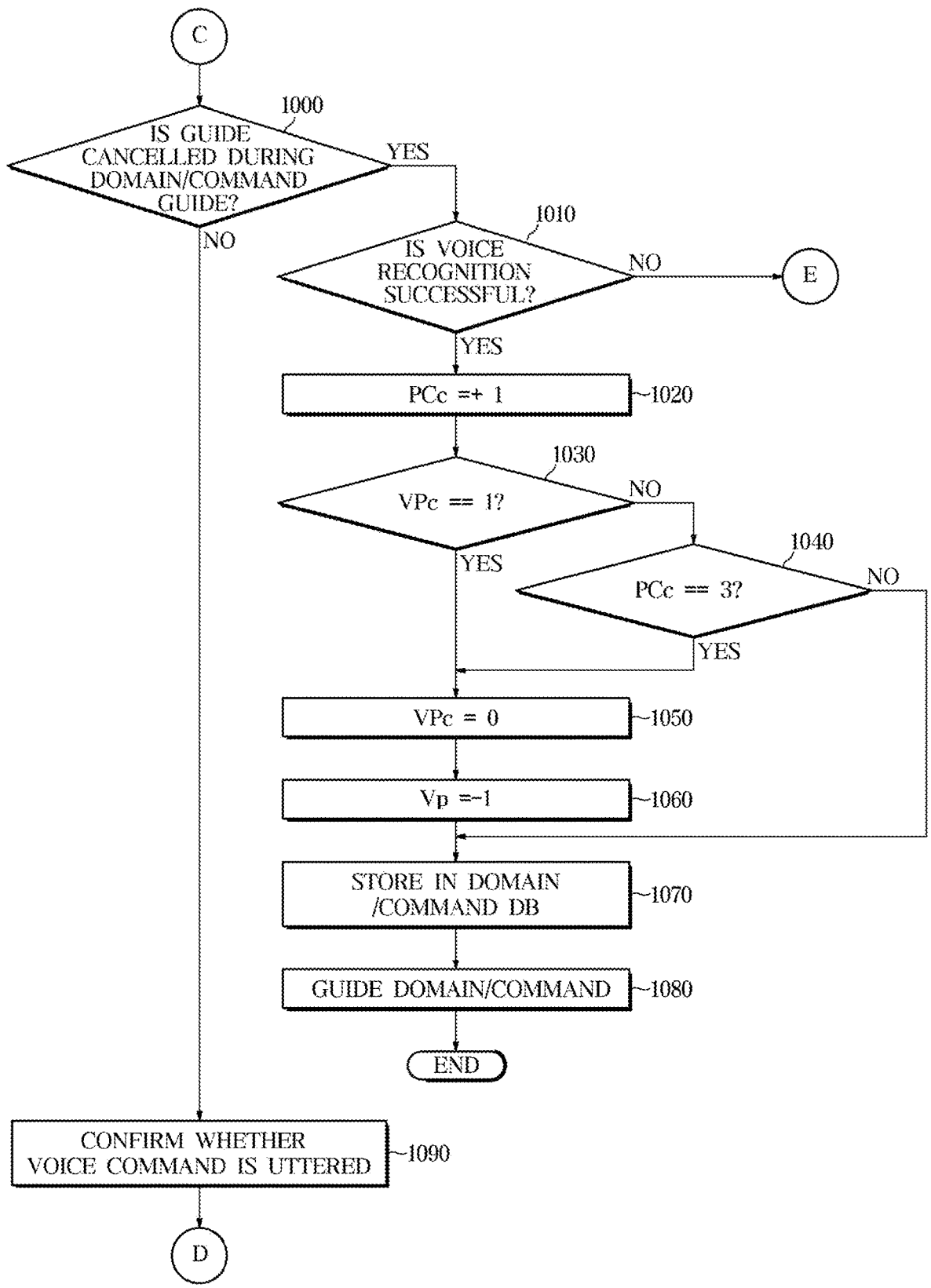
FIGS. 10 and 11 are flowcharts illustrating operations of updating a PCc, VPc, and VP in a vehicle according to an embodiment.
Figure 11:
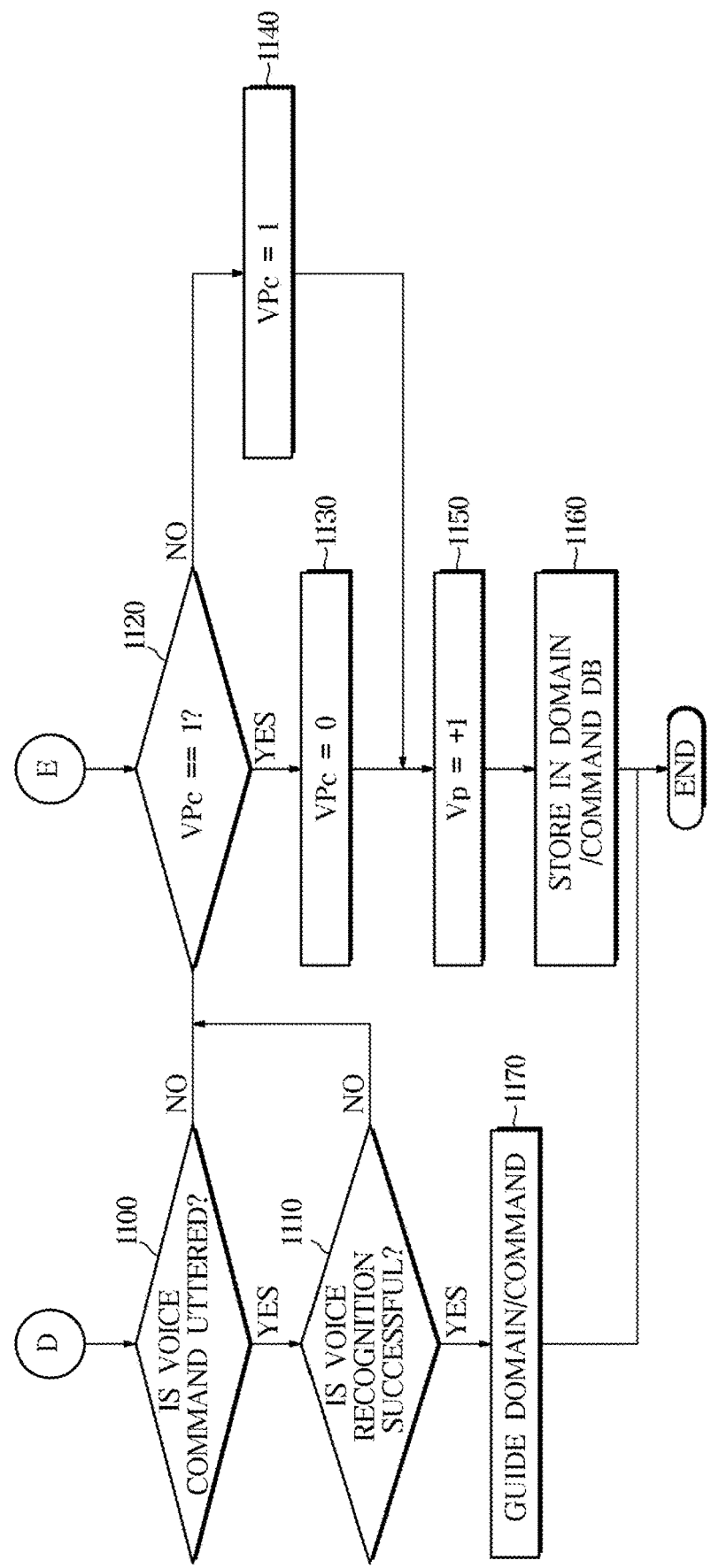

FIGS. 10 and 11 are flowcharts illustrating operations of updating a PCc, a VPc, and a VP in the vehicle 100 according to an embodiment.

Referring to FIGS. 10 and 11 together, the processor 200 may update a PCc, a VPc, and a VP after an initial state following a start of voice recognition.

The processor 200 may determine whether a user utters a command even though a voice recognition guide is not finished, that is, when a guide is cancelled during a domain/command guide (1000). Afterwards, the processor 200 may determine that the user is familiar with the corresponding command when voice recognition is successful (1010).

That is, because the voice recognition is successful without listening to the voice recognition guide to the end, which indicates that the user accurately recognizes a command to be required to be input, and thus it may be determined that the user is familiar with the corresponding command.

When it is determined that the voice recognition is successful and the user is familiar with the corresponding command as described above (Yes in operation 1010), the processor 200 may increase the PCc by 1 (1020).

Next, the processor 200 may determine whether a VPc value is 1 (1030).

The processor 200 may determine whether the PCc is 3 which is a predetermined reference value (1040), in order to secure a reliability of a familiarity level of the user for the command. The processor 200 may not change a voice recognition guide mode until the PCc is increased to 3 (No in operation 1040).

When the VPc value is 1 (Yes in operation 1030), the processor 200 may determine that the recognition of the command fails in an expert mode where command usage is familiar for the user, set the VPc value as 0 (1050), and change to a first mode by decreasing a VP value by 1 to reduce a degree of detail of guide (1060).

That is, when the recognition of the command fails in the expert mode, which indicates that the user temporarily forgets the command despite the user's familiarity with the corresponding command, the processor 200 may change to the first mode by decreasing the VP value by 1 without accumulation of PCc, in order to reduce the degree of detail of guide.

Afterwards, the processor 200 may store the changed PCc in the domain/command DB (1070), and when a same command is used later, may guide by reflecting a usage history.

The processor 200 may guide a domain/command in the changed voice recognition guide mode (1080).

When the user listens to the voice recognition guide to the end, which indicates that the user is not familiar with the command, the processor 200 may confirm whether the user utters a voice command without changing the PCc (1090).

Afterwards, the processor 200 may determine whether the voice command is uttered (1100). When the voice command is uttered (Yes in operation 1100), the processor 200 may determine whether voice recognition is successful (1110). When it is determined that the voice recognition is successful (Yes in operation 1110), the processor 200 may display a guide corresponding to a domain and command (1170).

When the user has not uttered the voice command (No in operation 1100) or it is determined that the voice recognition fails due to utterance of another command (No in operation 1110), the processor 200 may determine whether a VPc value is 1 (1120).

When the VPc value is 1 (Yes in operation 1120), the processor 200 may determine that the voice recognition fails in the expert mode where the user is very familiar with a command.

That is, when the VPc value is 1, which indicates that the voice recognition fails in the expert mode, the processor 200 may change the VPc value to 0 (1130).

When the VPc value is not 1 (No in operation 1120), the processor 200 may change the VPc value to 1 and determine that the user temporarily forgets the command in the expert mode (1140).

Afterwards, because the voice recognition fails, the processor 200 may set the VP value by 1 to increase the degree of detail of voice recognition guide (1150).

Next, the processor 200 may store the changed PCc in the domain/command DB (1160).

Figure 12:
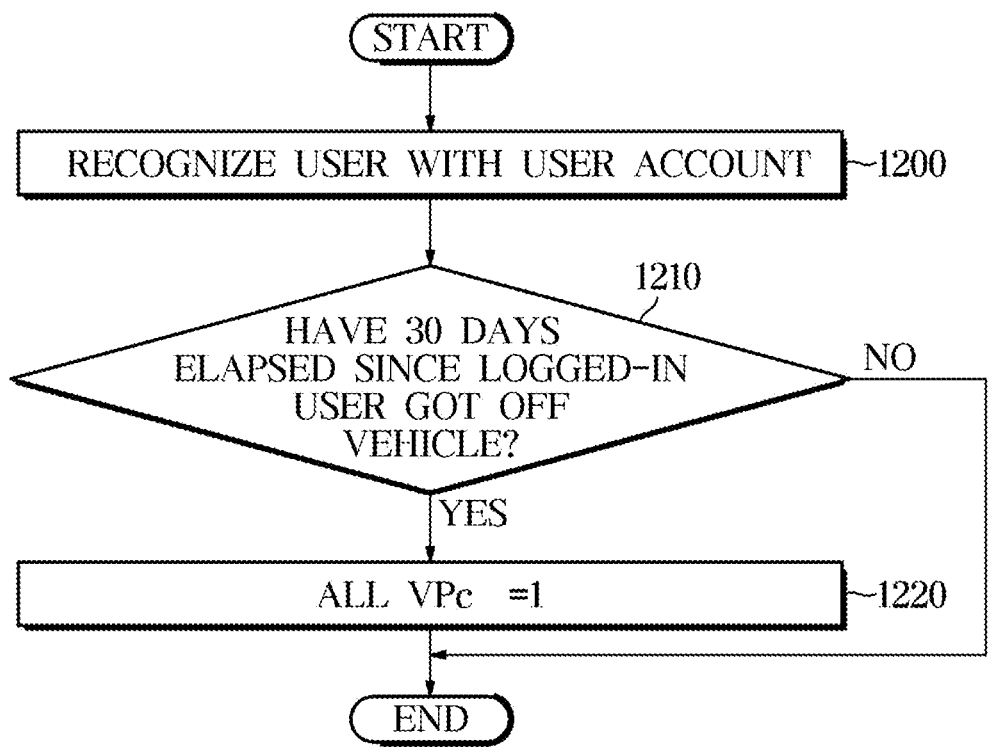
FIG. 12 is a flowchart illustrating operations of updating a VPc in a vehicle according to an embodiment, when the vehicle has not been used for a long time.

FIG. 12 is a flowchart illustrating operations of updating a VPc in the vehicle 100 according to an embodiment, when the vehicle has not been used for a long time.

Referring to FIG. 12, the processor 200 may control the communicator 500 to transmit user login information to the server 600 in order to recognize a user with a user account (1200). Afterwards, the processor 200 may transmit information about voice recognition usage history of the user corresponding to the user login information from the server 600.

The processor 200 may determine whether 30 days have elapsed since the logged-in user got off the vehicle 100 (1210). When 30 days have elapsed (Yes in operation 1210), the processor 200 may set all VPc values to 1 (1220).

When the user has not used the vehicle 100 for more than 30 days, because the user may temporarily forget how to use voice recognition, the processor 200 may set VPc values of all domains/commands to 1. Afterwards, when the user stops a voice recognition guide and the voice recognition is successful with respect to a command, the processor 200 may change to a first mode by decreasing a VP value by 1 without accumulation of the PCc to reduce a degree of detail of guide.

Referring back to FIG. 1, the processor 200 may receive an input for user login information through the inputter 401 and transmit the user login information to the server 600. The server 600 may transmit information about voice recognition usage history of the logged-in user to the vehicle 100.

In the vehicle 100 according to an embodiment, the processor 200 may manage all databases for each user, and because each user has a different familiarity level with each command, values of all variables may vary for each user.

The processor 200 may manage the database for each user and determine a familiarity level for each command based on a usage history. Accordingly, the processor 200 may improve a usability of voice recognition by reducing a guide prompt for a familiar command and providing a detailed guide prompt for a command used for the first time or a command not frequently used.

Detailed embodiments of a control method of the vehicle 100 are the same as those of the vehicle 100 described above, a description thereof is omitted.

As is apparent from the above, according to the embodiments of the disclosure, the vehicle and the control method thereof can determine how familiar a user of the vehicle is with each command, set a simple guide prompt for a familiar command and set a detailed guide prompt for a unfamiliar command, thereby may improve a usability of voice recognition.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A voice recognition apparatus for use in a vehicle, comprising:
   a user interface configured to receive a command from a user;
   a memory storage configured to store data, the data comprising a voice recognition usage history of the user; and
   a processor configured to automatically change a voice recognition guide mode, the voice recognition guide mode being chosen from a plurality of voice recognition guide modes according to a degree of detail of a voice recognition guide based on the voice recognition usage history,
   wherein the plurality of modes include a first mode and a second mode, and if the first mode is changed to the second mode, the degree of detail of the voice recognition guide is increased, and
   wherein the processor is further configured to change the voice recognition guide mode from the first mode to the second mode if the user does not use the vehicle for a time period greater than a reference number of days.

2. The voice recognition apparatus of claim 1, wherein the processor is configured to change the voice recognition guide mode from the second mode to the first mode if: a number of successful voice recognition commands of the user is accumulated more than a reference number of times for the same command.

3. The voice recognition apparatus of claim 1, wherein the processor is configured to change the voice recognition guide mode to the second mode if the voice recognition guide mode is in the first mode and a voice recognition fails.

4. The voice recognition apparatus of claim 3, wherein the processor is configured to determine that the voice recognition fails if the user does not utter a command for a period of time greater than a reference period of time or the user inputs a command of another domain.

5. The voice recognition apparatus of claim 3, wherein the processor is configured to determine that the voice recognition fails if the user utters a single sound, and thereafter the command is input after a reference period of time.

6. The voice recognition apparatus of claim 1, wherein, if the first mode is changed to the second mode due to a failure of a voice recognition, and thereafter the voice recognition is successful by the user inputting a same command before the voice recognition guide ends, the processor is further configured to change the voice recognition guide mode to the first mode.

7. The voice recognition apparatus of claim 1, wherein, if the voice recognition guide mode is changed from the first mode to the second mode, and then a voice recognition is successful by the user inputting a same command before the voice recognition guide ends, the processor is configured to change the voice recognition guide mode to the first mode.

8. The voice recognition apparatus of claim 1, further comprising the vehicle.

9. A control method of a voice recognition apparatus for use in a vehicle, the control method comprising:
- receiving a command from a user;
- storing data about a voice recognition usage history of the user; and
- automatically changing a voice recognition guide mode chosen from a plurality of voice recognition guide modes according to a degree of detail of a voice recognition guide based on the voice recognition usage history,
- wherein the plurality of modes include a first mode and a second mode, and if the first mode is changed to the second mode, the degree of detail of the voice recognition guide is increased, and
- wherein the changing of the voice recognition guide mode changes the voice recognition guide mode from the first mode to the second mode if the user does not use the vehicle for a time period greater than a reference number of days.

10. The control method of claim 9, wherein the changing of the voice recognition guide mode step changes the voice recognition guide mode from the second mode to the first mode if: a number of successful voice recognition commands of the user is accumulated more than a reference number of times for the same command.

11. The control method of claim 9, wherein the changing of the voice recognition guide mode step changes the voice recognition guide mode to the second mode if the voice recognition guide mode is in the first mode and a voice recognition fails.

12. The control method of claim 11, wherein the changing of the voice recognition guide mode step determines that the voice recognition fails if the user does not utter a command for a period of time greater than a reference period of time or the user inputs a command of another domain.

13. The control method claim 11, wherein the changing of the voice recognition guide mode determines that the voice recognition fails if the user utters a single sound, and thereafter the command is input after a reference period of time.

14. The control method of claim 9, wherein, if the first mode is changed to the second mode due to a failure of a voice recognition, and thereafter the voice recognition is successful by the user inputting a same command before the voice recognition guide ends, the changing of the voice recognition guide mode step changes the voice recognition guide mode to the first mode.

15. The control method of claim 9, wherein, i the voice recognition guide mode is changed from the first mode to the second mode, and then a voice recognition is successful by the user inputting a same command before the voice recognition guide ends, the changing of the voice recognition guide mode changes the voice recognition guide mode to the first mode.

* * * * *